Figure 1:
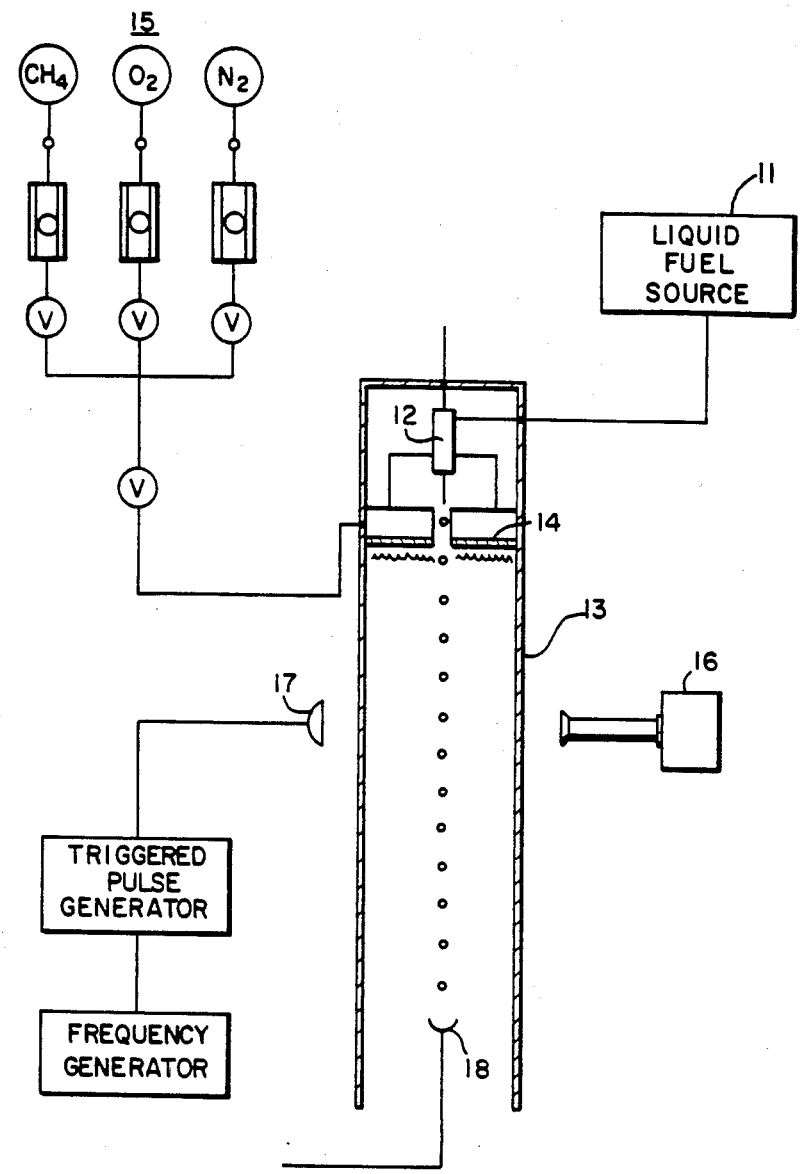
Figure 2:
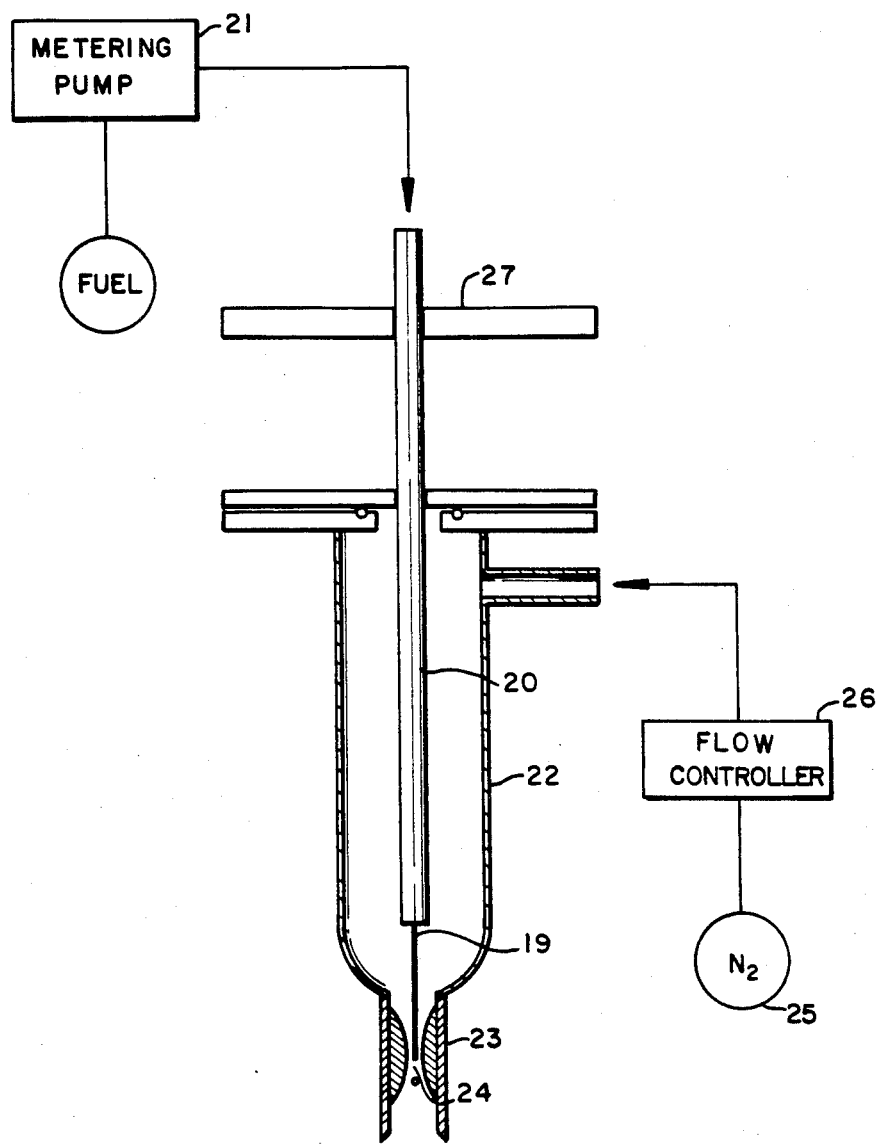

United States Patent [19]

Green et al.

[11] Patent Number: 4,819,831

[45] Date of Patent: Apr. 11, 1989

[54] DROPLET GENERATING APPARATUS

[75] Inventors: Gary J. Green, Yardley, Pa.; Frederick L. Dryer, Pennington, N.J.; Dennis E. Walsh, Richboro, Pa.

[73] Assignee: Mobil Oil Corporation, New York, N.Y.

[21] Appl. No.: 99,860

[22] Filed: Sep. 22, 1987

Related U.S. Application Data

[60] Division of Ser. No. 917,288, Oct. 9, 1986, Pat. No. 4,717,049, which is a continuation of Ser. No. 596,990, Apr. 5, 1984, abandoned.

[51] Int. Cl.$^4$ .............................................. B65D 47/18
[52] U.S. Cl. .................................... 222/420; 261/76
[58] Field of Search ............... 222/420, 422, 566, 630, 222/571, 255, 262, 263; 73/861, 861.41; 604/251, 253, 65; 422/99; 261/76, 116

[56] References Cited

U.S. PATENT DOCUMENTS

| | | | |
|---|---|---|---|
| 3,023,171 | 2/1962 | Smith | 252/359 |
| 3,489,396 | 1/1970 | D'Aragon | 261/25 |
| 3,677,447 | 7/1972 | Rentz | 222/420 |
| 3,731,850 | 5/1973 | Weitzel et al. | 222/420 |
| 3,979,334 | 9/1976 | Lee et al. | 252/448 |
| 4,441,532 | 4/1984 | Hrubesh | 222/420 |
| 4,446,993 | 5/1984 | Tokorzawa | 222/420 |
| 4,628,040 | 12/1986 | Green et al. | 502/9 |

FOREIGN PATENT DOCUMENTS

| | | | |
|---|---|---|---|
| 2516830 | 2/1930 | Australia | 68.9/79.4 |
| 1191247 | 5/1947 | Australia | 79.4/68.9 |
| 1017066 | 2/1968 | Australia | 68.9/74.9 |
| 3640871 | 6/1973 | Australia | 31.1/31.5 |
| 1068223 | 9/1957 | Fed. Rep. of Germany | 261/76 |
| 1068223 | 9/1957 | Fed. Rep. of Germany | 261/76 |
| 2045390 | 3/1972 | Fed. Rep. of Germany | 222/420 |
| 2259521 | 6/1973 | Fed. Rep. of Germany | 222/420 |
| 1411783 | 7/1964 | France . | |
| 286273 | 2/1953 | Sweden | 222/420 |
| 1039539 | 9/1983 | U.S.S.R. | 261/76 |
| 1311285 | 3/1973 | United Kingdom . | |

OTHER PUBLICATIONS

W. R. Lane, "A Microburette for Producing Small Liquid Drops of Known Size"; Journal of Scientific Instruments, vol. 24, Apr. 1947, pp. 98–101.

K. Riel et al., "An Apparatus for the Production of Uniform Sized Water Drops at Desired Time Intervals", Review of Scientific Instruments, vol. 40, No. 4, Apr. 1969, pp. 532–534.

"Combustion Rates of Freely Falling Fuel Drops in a Hot Atmosphere", J. A. Bolt et al., Sixth Symposium International in Combustion, The Combustion Institute, 1957.

"Evaporation and Combustion of Single Fuel Droplets in a Hot Atmosphere", M. A. Saad, Doctoral Dissertation Series, Publ. No. 21,355, University of Michigan, 1956.

*Primary Examiner*—Joseph J. Rolla
*Assistant Examiner*—Kenneth Noland
*Attorney, Agent, or Firm*—Alexander J. McKillop; Charles J. Speciale

[57] ABSTRACT

Uniform droplets of a liquid are produced by positioning the end of a capillary tube in the throat of a venturi. Gas flowing through the venturi detaches droplets from the end of the capillary tube without requiring high volume gas flow or excessively high velocity of the droplets.

19 Claims, 7 Drawing Sheets

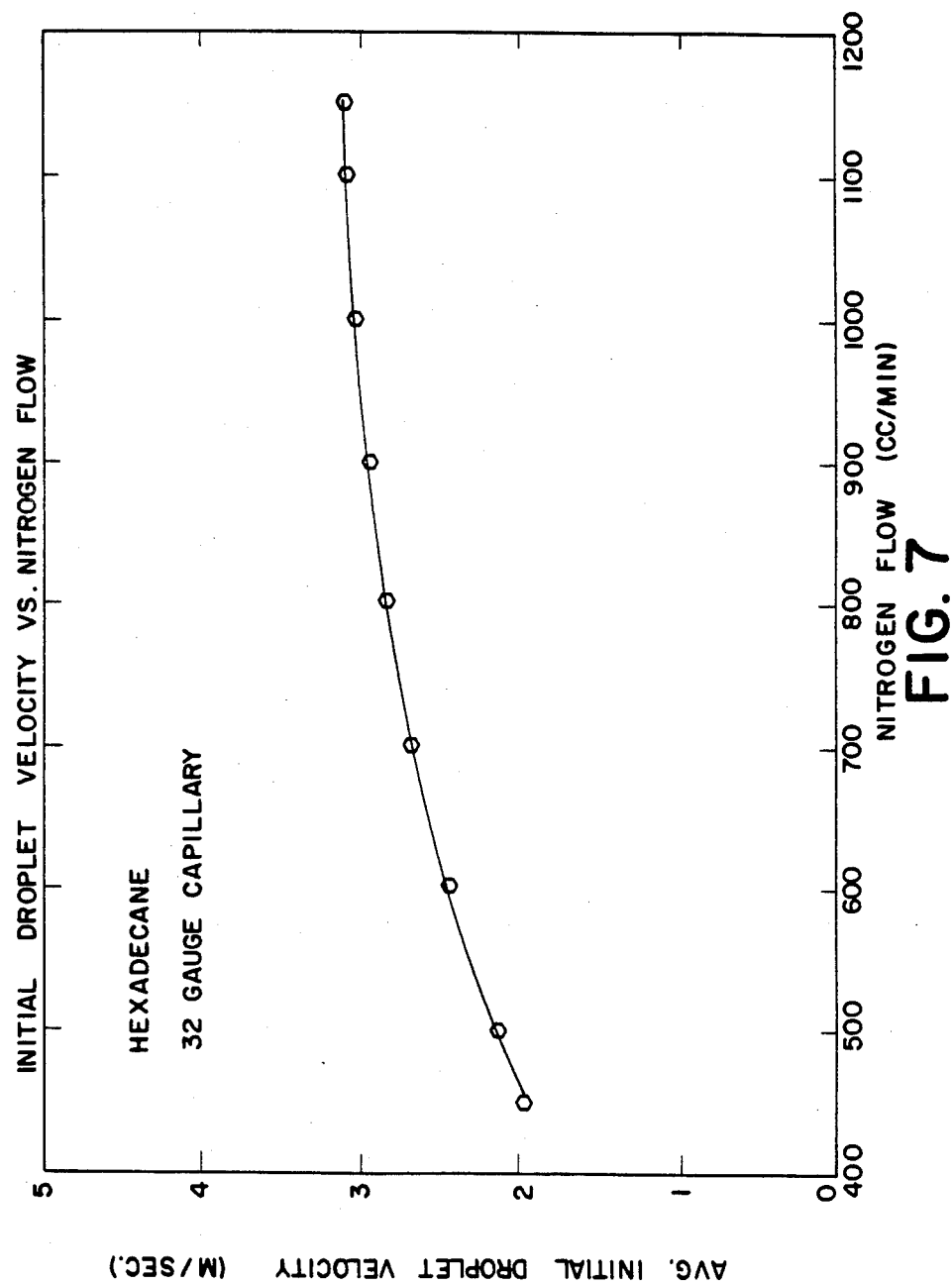

DROPLET GENERATING APPARATUS

This is a divisional of copending application Ser. No. 917,288, filed on Oct. 9, 1986 now U.S. Pat. No. 4,717,049, which is a file wrapper continuation of application Ser. No. 596,990, filed Apr. 5, 1984, now abandoned.

BACKGROUND OF THE INVENTION

This invention relates to the generation of small, widely spaced droplets of uniform size and more particularly, to the generation of such droplets by placing the end of a capillary tube in a venturi throat.

A need exists in laboratory experimentation and in scientific analyses for the production of a stream of uniform, isolated droplets of liquid. Streams of small, uniformly-sized droplets are required, for example, in testing aerosol standards for environmental toxicological studies, ink jet printing methods, new nebulization techniques for flame atomic absorption spectroscopy, novel means for investigating fast chemical reaction kinetics, and new approaches to studying the combustion behavior of fuels. Several techniques are currently used for producing streams of small uniform droplets suitable for such applications. See, for example, J. J. Sangiovanni and A. S. Kestin, Combustion Science and Technology 16, 59 (1977); J. C. Lasheras, A. C. Fernandez-Pello, and F. L. Dryer, Combustion Science and Technology 21, 1 (1979); C. H. Wang, X. Q. Liu and C. K. Law, Paper No. 82-81, Fall Western States Meeting, The Combustion Institute, Sandia Laboratories, Livermore, CA Oct. 11–12, 1982.

The prior art includes Rayleigh instability and mechanical chopping techniques of producing droplets which rely on physically breaking up an established high velocity liquid jet by electromagnetically induced mechanical vibrations or high speed rotary shuttering, respectively. Piezoelectric techniques can be used to expel droplets by mechanical constrictions applied to a liquid reservoir. The use of moving parts or electronic components for the production of droplets gives rise to the possibility of component failure, or drift, which adversely affects repeatability with time.

A major restriction to the use of Rayleigh instability for exploring isolated droplet combustion is the limited droplet spacing inherently available. However, no alternative droplet generation techniques (e.g., mechanical chopping or piezoelectric techniques) producing well-spaced ($\geq 30$ droplet diameters) droplets have been described which are adaptable for use in combustion apparatus without introducing significant experimental complexities. J. A. Bolt and M. A. Saad, "Combustion Rates of Freely Falling Fuel Droplets in a Hot Atmosphere", Sixth Symposium (International) on Combustion, p. 717, The Combustion Institute, 1957, describes an apparatus for forming fuel droplets by a small bore tube from which the drops are thrown by a concentric jet of air. Droplet size is controlled by capillary bore size, pressure of the concentric air head, head of the fuel and the distance the capillary protrudes beyond the air nozzle. Resultant droplets are $\sim 1.1$ mm in diameter, much larger than those found in typical combustion systems. In the laboratory, as well as practical combustion devices, there exists a limited droplet residence time within the combustor during which complete burnout must be achieved. Very large droplets (such as those described above) would require inordinately large combustion chambers to approach complete or nearly complete burnout. Note that the device of Bolt and Saad resulted in droplets which burned to $\sim 300 \mu$ diameter over the length of their combustor, far from complete burnout.

It is an object of the invention to provide apparatus for producing uniform droplets of controlled, substantially smaller size in which the droplet spacing, and initial velocity can be regulated.

SUMMARY OF THE INVENTION

In accordance with the present invention droplets are induced by a venturi throat which produces high velocity gas flow to detach uniform droplets from the end of a capillary tube. In accordance with the invention, the venturi includes a converging-diverging nozzle which forms droplets with good trajectory, and with the desired droplet size and spacing. The present invention alleviates problems associated with prior art apparatus including problems of droplet size and spacing, restricted operating ranges, significant liquid volume requirements, and cost and complexity of the apparatus found in the prior art.

The foregoing and other objects, features and advantages of the invention will be better understood from the following more detailed description and appended claims.

DESCRIPTION OF THE DRAWINGS

FIG. 1 shows the droplet producing apparatus of the present invention in a system for measuring the combustion of fuel;

FIG. 2 shows the droplet generation device of the present invention;

FIG. 3 shows droplet diameter versus nitrogen flow in an exemplary practice of the invention;

FIG. 4 shows droplet spacing versus nitrogen flow in an exemplary practice of the invention;

FIG. 5 shows droplet spacing versus nitrogen flow in an exemplary practice of the invention;

FIG. 6 shows droplet frequency versus nitrogen flow; and

FIG. 7 shows initial droplet velocity versus nitrogen flow in an exemplary practice of the invention.

DESCRIPTION OF THE PREFERRED EMBODIMENT

FIG. 1 depicts a source of liquid fuel 11 to be tested. The liquid fuel is supplied to the droplet generation device 12 of the present invention.

Droplets are produced in the combustion duct 13 which has a flat flame burner 14 supplied with fuel, oxygen and nitrogen from the sources shown at 15.

Optical detection of the combustion process is performed by a detector 16 such as a camera or optical probe, and a triggered light source 17. The residue of the combustion process is collected in sample collection probe 18.

Referring to FIG. 2, the droplet generation device of the present invention includes a capillary tube 19 having a liquid receiving end which is connected to the tube 20 which contains fuel from the metering pump 21. An outer concentric tube 22 has a venturi 23 at the bottom thereof. The tip of capillary tube 19 is positioned in the throat 24 of the venturi 23.

Venturi 23 is a converging-diverging nozzle with the diverging nozzle section having a half angle of 7.5° degrees in an exemplary embodiment. The converging-diverging nozzle insures a better trajectory of the droplets than other veturis.

Nitrogen gas from source 25 is supplied through flow controller 26 which regulates the flow of gas through the venturi to control the formation of droplets from the tip of the capillary tube. By varying the liquid flow, gas flow, and capillary size, the droplet size, spacing, frequency and initial velocity may be precisely controlled.

A stream of droplets is produced by inducing premature detachment of incompletely formed droplets at the tip of the capillary 19. This detachment is accomplished by drag caused by the annular flow of gas past the capillary tip which is positioned in the throat 23 of the venturi. The gas is accelerated past the tip of the capillary by the venturi and then decelerated upon exit from the throat of venturi 23. Droplets thus formed are much smaller in diameter than those that would result from natural detachment due to the weight of the droplet overcoming the interfacial tension at the capillary tip.

Precise metering of the liquid flow is controlled by the metering pump 21 and flow controller 26 accurately controls gas flow.

Accurate positioning of the capillary tip with respect to the venturi is accomplished with a micrometer driven translation stage 27. In an exemplary embodiment of the invention, a 32-gauge (0.004" inside diameter) stainless steel capillary was positioned in the throat of a venturi of approximately 1 mm inside diameter.

The critical relationship between the size of the venturi throat and the diameter of the capillary tube will depend on the type of droplets to be produced. For the testing of fuels as described herein, the capillary tube 19 has an inside diameter in the range of about 0.001" to 0.035" and outside diameter of 0.005" to 0.05". The outer concentric tube 22 has an inside diameter in the range of 0.1" to 2", and the throat of the venturi 23 has an inside diameter in the range of 0.01" to 0.075", and a throat length in the range of 0.03" to 0.3".

Droplet characterization was carried out by a helium-neon laser aligned to intersect the path of the droplet stream. Scattered laser light from the droplets passing through the beam was detected with a photodiode mini-probe. Resultant modulated photodiode output signal was monitored with an oscilloscope to yield directly the droplet frequency, i.e., the rate of droplet production. The output signal was also supplied to a strobe lamp used to synchronously back illuminate the droplet stream for visual observation and photography to accurately measure droplet size and spacing.

The appearance of a hexadecane droplet emerging from the tip of the device was spherical and relatively well centered with respect to the tip. The extent of droplet spacing available with the present invention was shown by droplets spaced by 100 droplet diameters, a spacing 20-50 times greater than that obtained via Rayleigh instability techniques. The relationships between droplet size, spacing, and frequency associated with the current technique are distinctly different from those observed with the Rayleigh instability technique.

Figure 3:
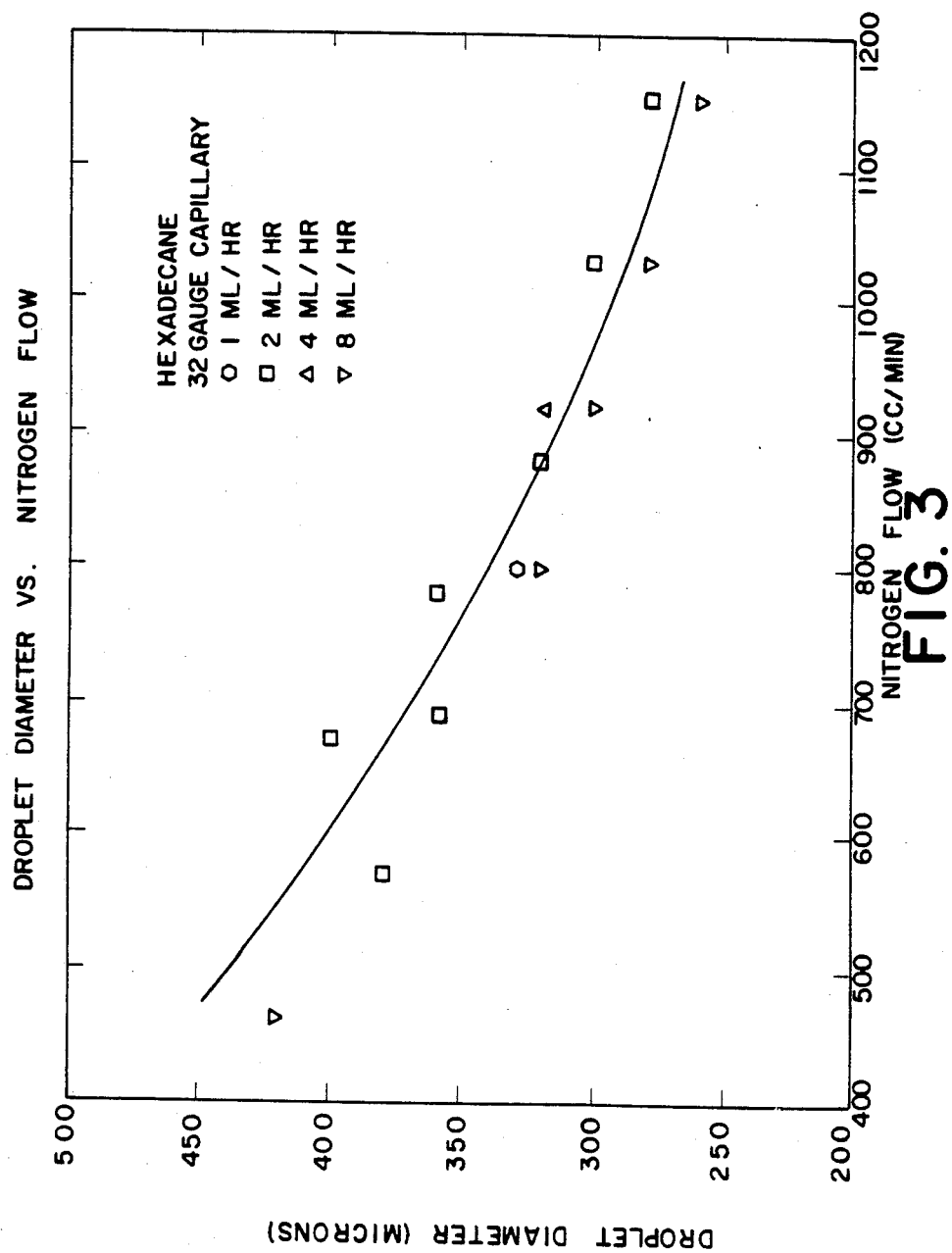
Figure 4:
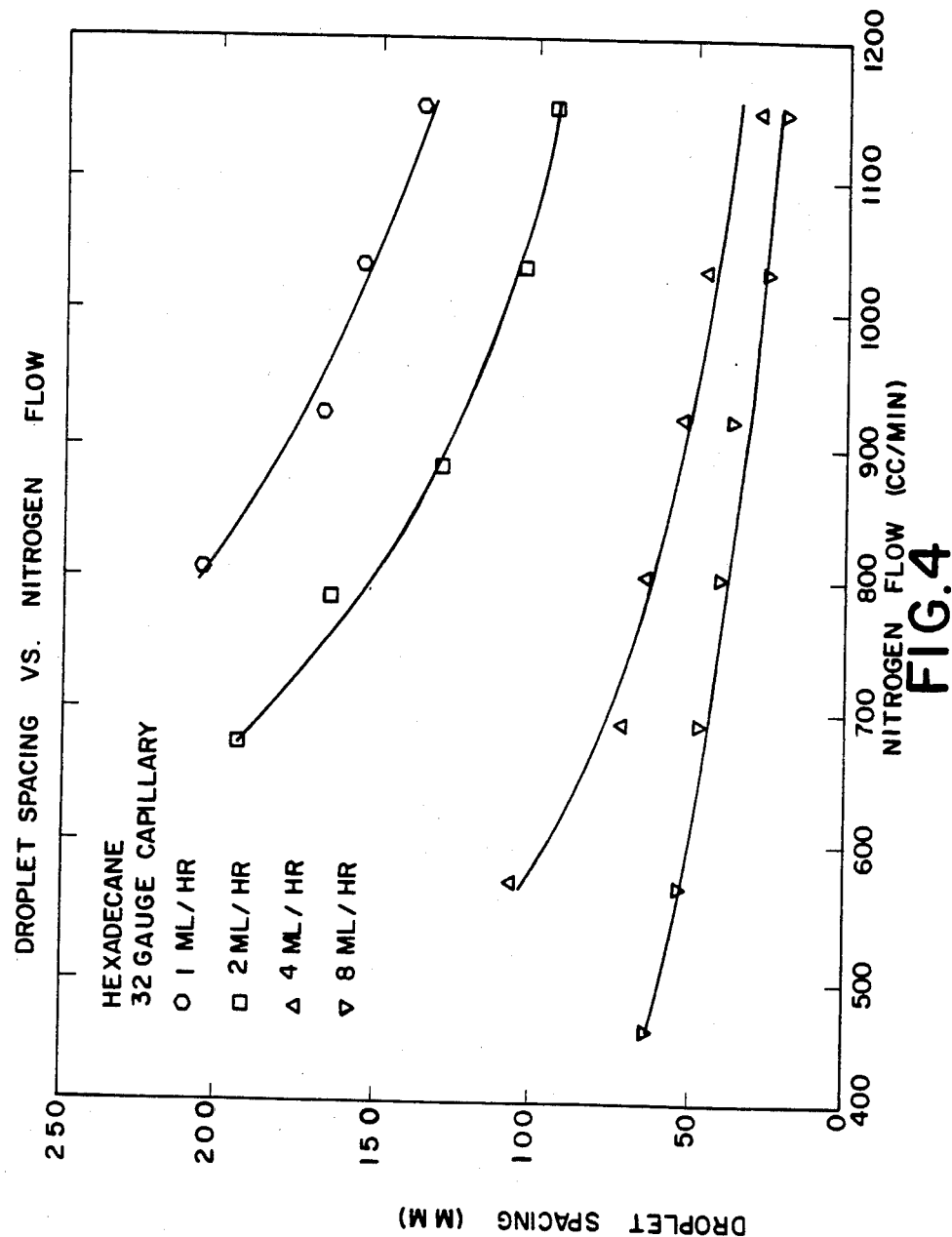
Figure 5:
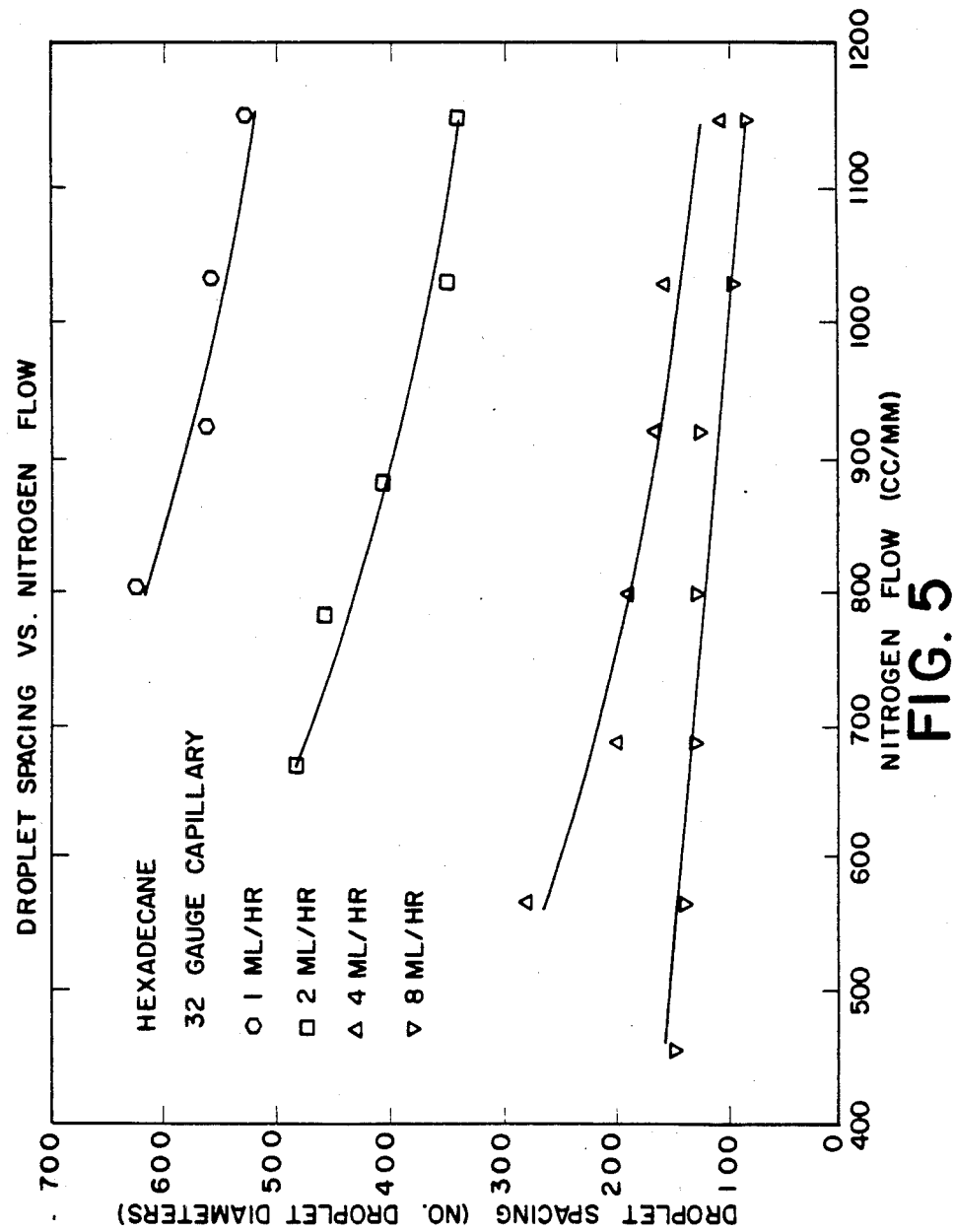

By observing droplet diameter and spacing for a variety of liquid and gas flow rates, the results depicted in FIGS. 3, 4, and 5 were obtained. FIG. 3 shows that droplet diameter decreases with increasing nitrogen flow past the capillary tip, relatively independently of of the liquid flow rate through the capillary. FIG. 4 shows that inter-drop spacing also decreases with increased nitrogen flow. The magnitude of the spacing, however, clearly depends on the rate of liquid flow through the capillary, viz. for a given nitrogen flow, the droplet spacing decreases with increasing liquid flow. FIG. 5 presents the droplet spacing data shown in FIG. 4 in terms of numbers of droplet diameters separating individual droplets. It is evident that droplet spacings from 100 to 600 droplet diameters may be achieved by simply varying the flow conditions across the ranges indicated in the figure.

Figure 6:
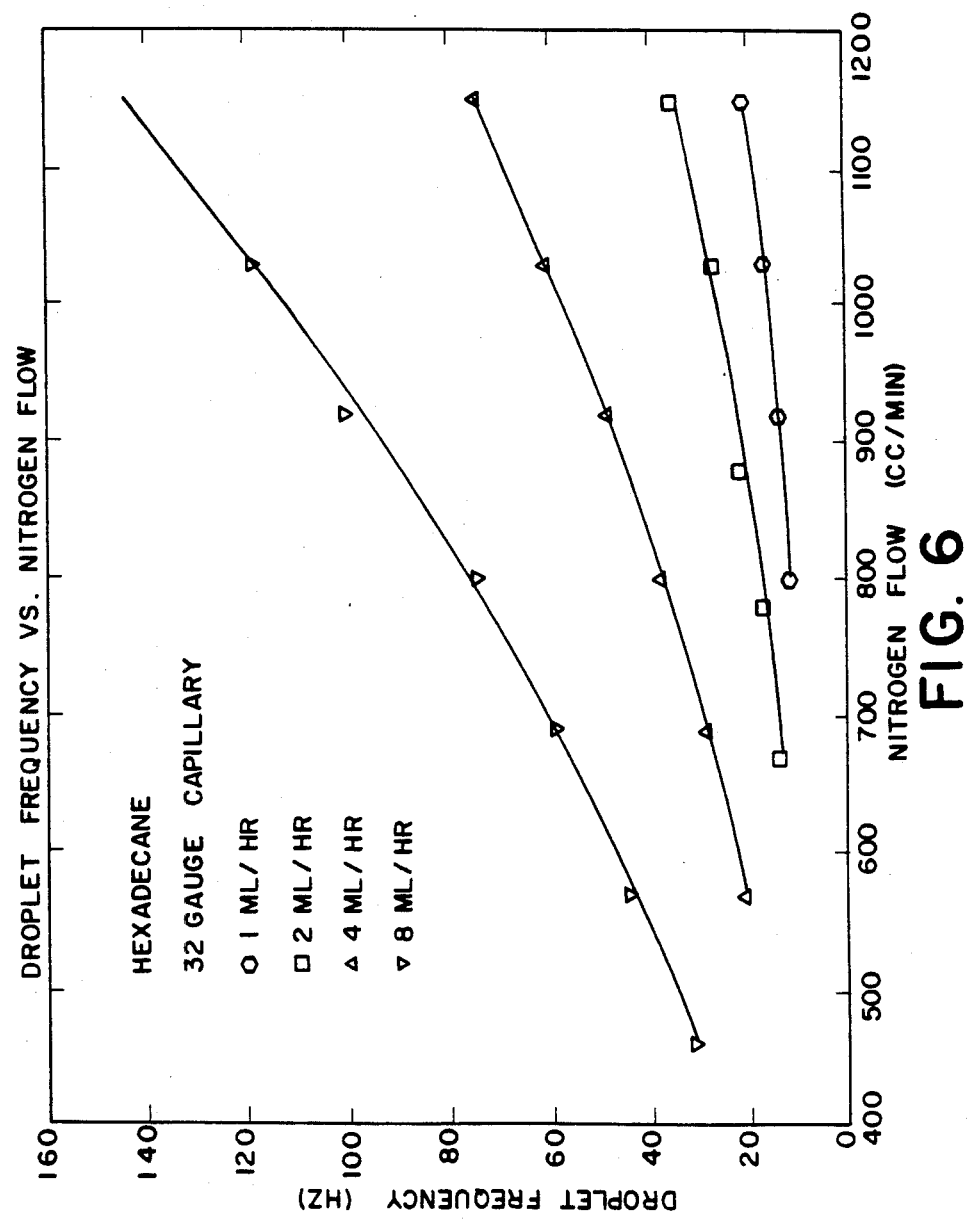

The frequency of production of the resultant droplets as a function of operating parameters is illustrated in FIG. 6. Droplet frequency increases with increasing nitrogen flow and also increases with increasing liquid flow. The relatively low frequencies of 10-150 Hz produced in the invention should be contrasted to the 500-2000 Hz production rates observed in previous work on the Rayleigh instability technique. The low droplet production rates coupled with the relatively low liquid flow rates (<10 ml/hr) in the current device offer the advantage of greatly reduced liquid requirements compared to the Rayleigh instability technique which required 200-400 ml/hr liquid flow.

The initial velocity of droplets produced was also determined as a function of liquid and nitrogen flow by multiplying the initial droplet spacing by the droplet frequency. The collective results are plotted as a single curve in FIG. 7 and show that the initial droplet velocity has a mild dependence on nitrogen flow, gradually increasing with increasing flow. There is no clear dependence on liquid flow rate from the present data. Average initial droplet velocities are 2-3 m/s, comparable to those obtained with the Rayleigh instability technique and suitable for low Reynolds number studies of isolated droplet combustion in the current droplet combustion device. Studies with light No. 6 marine fuel have shown nominally the same behavior in terms of droplet size, spacing, frequency and velocity.

While a particular embodiment of the invention has been shown and described, various modifications are within the true spirit and scope of the invention. The claims are, therefore, intended to cover all such modifications.

What is claimed is:

1. A method of producing uniform droplets of a liquid comprising:
   supplying a stream of gas to a concentric tube, said stream of gas flowing through said concentric tube;
   supplying said liquid to a first end of a capillary tube positioned in said concentric tube;
   accelerating said stream of gas toward said first end of said capillary tube; and
   decelerating said stream of gas after said steam of gas passes said first end of said capillary tube;
   wherein said accelerating stream of gas detaches uniform droplets of diameter less than 450 micrometers of said liquid from said first end of said capillary tube as said accelerating stream of gas flows past said first end of said capillary tube, said detached droplets being spaced apart by a distance in the range of 100-600 droplet diameters.

2. The method recited in claim 1 further comprising the steps of;
   supplying said accelerating gas to a venturi throat; and
   regulating the flow of gas through said venturi throat to control the formation of droplets from said first end of said capillary tube;

wherein said uniform droplets of said liquid are detached by said accelerating gas flowing through said venturi throat.

3. The method recited in claim 1 further comprising the step of:

controlling the flow of liquid to said capillary tube to control the rate of droplet production.

4. The method recited in claim 3 wherein said liquid is supplied at a flow rate less than 10 ml/hr.

5. A method of producing uniform droplets of a liquid comprising:

supplying a stream of gas to a concentric tube;

supplying said liquid to an end of a capillary tube positioned in said concentric tube;

accelerating said stream of gas toward said first end of said capillary tube;

detaching uniform droplets of diameter less than 450 micrometers of said liquid from said first end of said capillary tube by said accelerating stream of gas as said accelerating stream of gas flows past said first end of said capillary tube; and decelerating said stream of gas upon detaching said uniform droplets of said liquid from said first end of said capillary tube, said detached droplets being spaced apart by a distance greater than approximately 25 mm apart.

6. The method recited in claim 5 further comprising the step of regulating the flow of said stream of gas to control the formation of droplets from the tip of said capillary tube.

7. The method recited in claim 5 further comprising the step of controlling the flow of liquid to said capillary tube.

8. The method of claim 5 further comprising the step of determining the rate of droplet production.

9. The method of claim 5 further comprising the step of measuring said droplet size.

10. The method recited in claim 5 further comprising the step of:

supplying said accelerating gas to a venturi throat;

wherein said uniform droplets of said liquid are detached by said accelerating gas flowing through said venturi throat.

11. The method recited in claim 10 further comprising the step of regulating the flow of gas through said venturi throat to control the formation of droplets from said first end of said capillary tube.

12. A method of producing uniform droplets of a liquid comprising:

supplying a stream of gas to a concentric tube;

supplying said liquid to a first end of a capillary tube positioned in said concentric tube to provide incompletely formed droplets at said first end of said capillary tube;

accelerating said stream of gas toward said first end of said capillary tube;

supplying said accelerating gas to a venturi throat;

detaching said incompletely formed droplets of said liquid from said first end of said capillary tube to produce uniform droplets spaced a distance greater than approximately 25 mm apart, said detached droplets being of diameter less than 450 micrometers and decelerating said stream of gas after said stream of gas passes said first end of said capillary tube.

13. The method recited in claim 12 further comprising the step of regulating the flow of gas through said venturi throat to control the formation of droplets from said first end of said capillary tube.

14. The method recited in claim 12 further comprising the step of controlling the flow of liquid to said capillary tube to control the rate of droplet production.

15. The method recited in claim 14 wherein said liquid is supplied at a flow rate less than 10 ml/hr.

16. A method of producing uniform droplets of a liquid comprising:

supplying a stream of gas to a concentric tube, said stream of gas flowing through said concentric tube;

supplying said liquid to a first end of a capillary tube positioned in said concentric tube;

accelerating said stream of gas toward said first end of said capillary tube;

decelerating said stream of gas after said stream of gas passes said end of said capillary tube; and controlling the flow of said liquid to said capillary tube to control the rate of droplet production;

wherein said accelerating stream of gas detaches uniform droplets of said liquid from said first end of said capillary tube as said accelerating stream of gases flows past said first end of said capillary tube, said droplets being produced at a frequency between 10–150 hz.

17. The method recited in claim 16 wherein said liquid is supplied at a flow rate less than 10 mil/hr.

18. A method of producing uniform droplets from a liquid comprising:

supplying a stream of gas to a concentric tube;

supplying said liquid to a first end of a capillary tube positioned in said concentric tube to provide incompletely formed droplets at said first end of said capillary tube;

accelerating said stream of gas toward said first end of said capillary tube;

supplying said accelerating gas to a venturi throat;

detaching said incompletely formed droplets of said liquid from said first end of said capillary tube;

decelerating said stream of gas after said stream of gas passes said first end of said capillary tube; and controlling the flow of said liquid to said capillary tube to control the rate of droplet production;

wherein said droplets are produced at a frequency between 10–150 hz.

19. The method recited in claim 18 wherein said liquid is supplied at a flow rate less than 10 ml/hr.

* * * * *